US007022202B2

(12) United States Patent
Goertzen

(10) Patent No.: US 7,022,202 B2
(45) Date of Patent: Apr. 4, 2006

(54) METHOD FOR APPLYING IMAGES TO SURFACES

(75) Inventor: Reiner J. Goertzen, Hillsboro, OR (US)

(73) Assignee: Mareiners, LLC, Hillsboro, OR (US)

( * ) Notice: Subject to any disclaimer, the term of this patent is extended or adjusted under 35 U.S.C. 154(b) by 105 days.

(21) Appl. No.: 10/754,213

(22) Filed: Jan. 8, 2004

(65) Prior Publication Data

US 2005/0150591 A1 Jul. 14, 2005

(51) Int. Cl.

| | |
|---|---|
| ***B44C 1/17*** | (2006.01) |
| ***B32B 37/26*** | (2006.01) |
| ***C09J 5/02*** | (2006.01) |
| ***B41M 3/12*** | (2006.01) |

(52) U.S. Cl. ...................... 156/232; 156/234; 156/235; 156/237; 156/240; 156/247; 156/289; 156/307.3; 156/307.5; 427/148; 427/258; 427/407.1

(58) Field of Classification Search ................ 156/196, 156/198, 230, 232–235, 237, 240, 247, 289, 156/307.1, 307.3, 307.5; 427/146–148, 258, 427/264, 271, 402, 407.1
See application file for complete search history.

(56) References Cited

U.S. PATENT DOCUMENTS

| | | | | |
|---|---|---|---|---|
| 4,451,335 | A | 5/1984 | Woods et al. | |
| 5,065,674 | A * | 11/1991 | Kobayashi et al. | 101/44 |
| 5,215,864 | A * | 6/1993 | Laakmann | 430/293 |
| 5,488,907 | A | 2/1996 | Xu et al. | |
| 5,529,972 | A * | 6/1996 | Ramello et al. | 503/227 |
| 5,718,792 | A * | 2/1998 | Goode | 156/228 |
| 5,976,296 | A * | 11/1999 | Sherman et al. | 156/230 |
| 6,298,685 | B1 * | 10/2001 | Tepman | 62/378 |
| 6,312,122 | B1 * | 11/2001 | Brown et al. | 347/101 |
| 6,761,794 | B1 * | 7/2004 | Mott et al. | 156/277 |

* cited by examiner

*Primary Examiner*—Chris Fiorilla
*Assistant Examiner*—Sing P. Chan
(74) *Attorney, Agent, or Firm*—ipsolon llp

(57) ABSTRACT

High quality full color images are printed with sublimation inks on transfer paper. The images are applied to prepared surfaces on parts, especially surfaces such as anodized aluminum prepared according to specific processes but also to other materials. Image transfer is accomplished by heating the part and/or the transfer paper and image under pressure. Once the image transfer is complete the parts are processed to ensure longevity of the image. The process may be used to apply images to parts having any 3 dimensional shapes.

15 Claims, 1 Drawing Sheet

METHOD FOR APPLYING IMAGES TO SURFACES

FIELD OF THE INVENTION

This invention relates to the field of technology relating to applying images to surfaces, and more particularly, to methods for applying images, including full color images, to surfaces such as anodized surfaces and other surfaces.

BACKGROUND

Anodizing is a well-known electrochemical process that changes the raw outer surface of a metal part (typically aluminum) into a metal oxide coating. The metal oxide coating is very hard compared to the base metal, and is generally very thin. Moreover, the oxide coating is relatively porous, and for that reason is capable of accepting a variety of dyes and inks that can add color and even images to the metallic surface.

There are several known methods for applying multicolor images to anodized surfaces, commonly aluminum parts and manufactured aluminum goods such as lighters, knives, and virtually any other aluminum item. Some of the known methods call for modifications to the anodizing process to modify the oxide coating on the outer surface of the part, but others work with standard anodized parts. Regardless of whether the anodized surface is prepared according to a specialized process or a more standard process, there are many different processes that have been used to transfer an image to the metallic part. Some processes transfer images that are first applied to paper to the anodized surface by causing the ink resident on the paper to sublimate such that it flows into pores in the anoxic coating. One example of a modified anodizing technique that also uses sublimating inks is described in U.S. Pat. No. 4,451,335. In the process described in that patent an aluminum part is anodized in the presence of a polyhydric alcohol. The part is washed and dried, and an image is applied to the surface by subliming ink from a heat transfer sheet such as paper to the surface of the anodized part, which is heated.

Other examples of techniques according to which images are transferred on to anodized surfaces include screen printing, staining, and melting a variety of coloring compounds.

The techniques mentioned above are said to result in the initial transfer of high quality images, including multicolor images. However, the durability of the images produced according to these processes is fairly low, especially when the part is exposed to ultra violet light, which causes the images to fade, in some cases quite rapidly.

There is a need, therefore, for a method of applying multicolor images to anodized surfaces and to surfaces made of other materials.

SUMMARY OF THE INVENTION

The present invention describes a process according to which high quality images including full color images with complex graphics and color separations are transferred to anodized parts. The process may be used to transfer high quality images to parts that are made of materials such as aluminum, steel and plastic.

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION OF THE PREFERRED EMBODIMENTS

The present invention relates to a process for applying high quality multi-color images to anodized parts. The process may be used to apply images to any anodized surface that is properly prepared. The surface of the part need not be planar, but instead can be in any 3-dimensional shape whatsoever, as detailed below. To cite just a few examples, the process allows high quality multi-color images to be applied to the entire outer surface of cylinders such as aluminum baseball bats, to relatively more planar objects such as knife handles, and to any other object. Nonetheless, for purposes of illustrating the invention in this detailed description, the process will be first described with reference to transferring and image to a relatively planar part.

Optional Pre-Treatment of the Part

Prior to anodizing the part it's surface may optionally be treated by bead blasting or other abrasive technique to disrupt the surface. For purposes of this description it is assumed that the part is an aluminum part. Disruption of the surface by bead blasting produces a somewhat different visual image compared to a part that has not had the surface disrupted, although the image that is transferred to the part according to the process detailed below is very high quality regardless of whether surface disruption is used prior to anodizing.

Anodizing the Part

Figure 1:
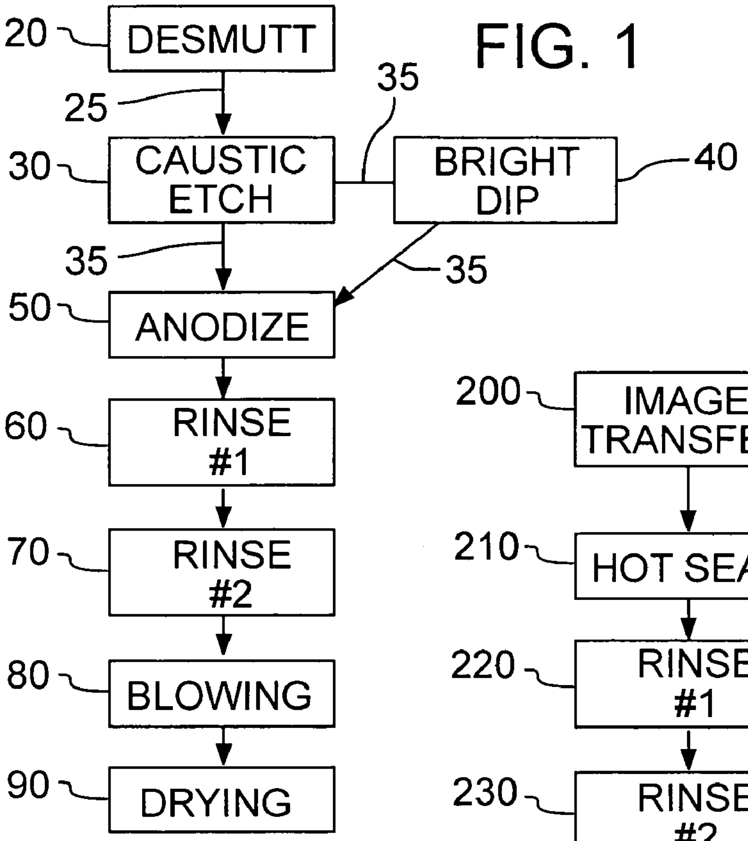
FIG. 1 is a flow chart detailing the primary process steps used to anodize the part according to the present invention.

With reference to FIG. 1, the part is anodized according to the following steps:

1. The part is immersed in a conventional desmutt tank 20 that contains an aqueous solution held at a temperature between about 60 to 100° F. The solution in the tank is agitated continuously. The solution contains about 1.5 to 2.5% by volume of a deoxidizing agent such as the commercially available product called NOVOX 320 and between about 4 to 6% by volume sulfuric acid. The length of time that the part is held in the desmutt tank is variable and depends upon the part appearance—if the part has heavy deposits of oils and grease on it, the time in the tank will be longer. Typical desmutt times are from about 2 minutes to 30 minutes or longer. After removal of the part from the tank the part is thoroughly rinsed 25 in clean water to remove all chemicals from the desmutt tank. Rinsing the part may be done by dipping the part in one or more tanks of clean water or by rinsing in the part in a flow of water.

2. The rinsed part is then transferred to a caustic etch tank 30 that contains a continuously circulating aqueous solution maintained at a temperature between 138° and 142° F., and more preferably at 140° F. The caustic etch tank solution contains between about 0.4 to 3.0% by weight caustic soda (NaOH). The length of time that the part is held in the caustic etch tank is variable and depends upon the part appearance. Typical etch times are from about 10 seconds to about 10 minutes. Because the caustic etch solution dissolves the aluminum the time in the tank should be closely monitored to achieve the desired finish.
3. The part is removed from the caustic etch tank and is thoroughly rinsed 35 as described above with respect to the desmutt tank.
4. If the image that is being transferred to the part has relatively bright colors and a high gloss finish is desired, then the part is transferred to a bright dip tank 40 that contains PHOSBRITE 172, a commercially available metal finishing compound manufactured by Albright & Wilson (www.albright.com.au), and about 3% by volume nitric acid. The solution is held at a temperature between about 205 and 215° F., and more preferably at 210° F. and preferably is continuously circulated. The length of time that the part is held in the bright dip tank is variable and depends upon the part appearance. Typical dip times are from about 5 seconds to about 5 minutes or more, depending upon the desired finish qualities. This bright dip step is optional and is used only when, as noted, the image includes bright colors and a glossy appearance is desired. The part is removed from the bright dip tank and is thoroughly rinsed 35 as described above.
5. Regardless of whether or not the part is bright dipped, it is then transferred to the anodizing tank 50. The anodizing tank is maintained at conventional conditions, for example, the tank typically will contain an aqueous solution of between about 150 to 175 g/l sulfuric acid, between about 1.5 to 3% ANOMAX 9000 (available through Luster-on Products, Inc., Springfield, Mass.). The solution in the tank is maintained at a temperature of between about 68 to 72° F., and more preferably at 70° F., and about 18 volts are applied to the solution. The solution is circulated at all times. The part is held in the anodizing tank under these conditions for at least about 30 minutes.
6. After removal from the anodizing tank the part is rinsed in a first clean water rinse, shown in FIG. 1 as rinse tank 60, with water held at about 170° F. Although this rinse is preferably done in a tank, it may be accomplished with a flowing stream of heated water. When the rinse is done in a tank, the water is circulated, preferably by bubbling air through the tank.
7. The part is then rinsed in a second clean water rinse at rinse tank 70, again with water held at about 170° F. either in a tank or in a flow, and under the same conditions as the prior rinse.

It is important that the rinsing is sufficient to remove all contaminants that may have deposited onto the part from the anodizing tank. Preferably, the water used in the rinsing steps is deionized. However, this is typically difficult to use in an industrial setting, so clean water from municipal sources may be used where necessary.

8. With continued reference to FIG. 1, the rinsed part is then blown off with compressed air at 80 to remove all water from the part.
9. The part is then placed in a heated dryer 90 to ensure that it is completely dry.

Preparing the Image

Virtually any image may be applied to the part. The image is prepared by printing the image with specialized sublimation inks on specialized papers so that the inks that comprise the image will sublimate onto the part such that the inks flow into the pores in the anoxic surface. Any computer system and associated software utilities for creating and managing images may be used. According to a preferred embodiment of the invention, an EPSON Stylus 3000 printer is used with a computer running PHOTOSHOP software. As noted, sublimation inks must be used to print the image. The preferred inks for use with the invention are digital sublimation inks available under the trade name DSS-PQ Disperse Sublimation Series—Piazo Q inks, from Rotech Digital, ApS (www.rotech-digital.com). The printer is fitted with black, magenta, cyan, yellow cartridges. With different types of printers, seven color cartridges containing standard sublimation inks are available that are sufficient for purposes herein.

The image is printed onto paper that is specially prepared to facilitate sublimation or transfer of the ink from the paper to another object—in this case onto the anodized part. The preferred transfer paper is sold under the trade name JET COL HTR 2000, available from Coldenhove Papier Fabriek B.U., Eerbek, Netherlands (www.coldenhove.nl).

The image is printed onto the paper using the software utility and the size of the image is adjusted so that it is appropriate for the size of the part onto which it will be printed.

Image Transfer to the Part

Figure 2:
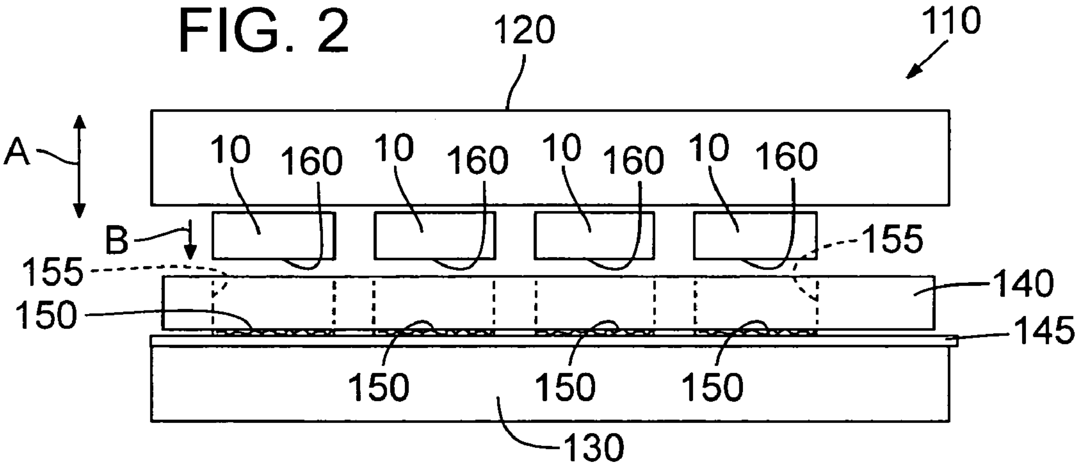
FIG. 2 is a schematic view of a heat press used in connection with the process described herein.

The image is transferred to the part through a sublimation process using a press that is heated and applies constant, even pressure between the paper and the part such that the entire area of the image is in pressurized contact with the part. Reference is now made to FIG. 2, which is a schematic and simplified illustrated of pertinent portions of a heat press 110, which includes a platen press 120, a base 130, and an optional template 140. The platen press is a heated member that typically is metallic and which is thermostatically controlled so that it's temperature may be accurately controlled. Platen press 110 is movable in the direction toward and away from base 120, illustrated by arrow A. Base 130 is a support structure onto which the paper 145 is laid. Base 130 typically is a deformable material such as high temperature silicone, although other similar materials may be used.

Paper 145 is laid onto base 130 with the printed image, represented in FIG. 2 by image 150, facing upwardly toward part 10. Plural parts 10 are shown in FIG. 2, and for each part 10 there is an image 150 printed onto paper 145. By printing many images 150 onto a single sheet of paper 145, multiple parts 10 may be printed in a single operation. Template 140 is typically a plate of metal that contains a through opening 155 sized to receive a part 10 so that the part 10 is held in a desired spatial orientation relative to image 150 when the heat press 110 is closed. More specifically, plural openings 155 are formed in template 140, one opening 155 for each part 10. A like number of images 150 are printed onto paper 145 and in positions on the paper such that the images align in a desired orientation relative to the openings 155. Thus, when paper 145 is positioned in heat press 110 on base 130, each image 150 aligns with a through opening 155. Template 140 thus functions to correctly and desirably align the image area with the parts and to maintain that orientation throughout the image transfer process. The parts 10, which are prepared according to the anodizing process described above and shown in FIG. 1, are placed into openings 155 such that the surface 160 onto which the image is to be transferred comes into contact with the image 150. In FIG. 2, each part 10 is thus slid downwardly into an opening 155 in the direction of arrow B until the lower surface 160 of part 10 makes contact with image 150.

Press platen 120 is preheated to about 400° F. With the template 140 loaded with parts 10, press platen 120 preheated, the press platen is moved downwardly toward the parts 10 and pressure is applied onto the parts by the press platen. This causes the surface 160 of part 10 to be pressed into image 150 and into the deformable base 130. The heated press platen heats each part, although the surface 160 is heated indirectly as the platen press contacts the opposing surface. The indirect heat causes the inks that comprise images 150 to sublimate and flow into the anodized surface. Moreover, because base 130 is deformable it at least partially surrounds the part, thereby ensuring that even pressure is exerted over the entire image area. The preferred amount of pressure applied between part 10 and image 150 is about 40 $lbs/in^2$, but more or less pressure may be used in any given situation. The base thus defines a mold into which the parts are pressed.

The temperature of press platen 120 and the amount of time that the platen is held against parts 10 depends upon several factors such as the thickness of the parts, the rate of heat transfer from the platen through the part, the nature of the image that is being transferred, etc. As an example, if part 10 is about ⅛ inch thick aluminum, a "cook" time of about 1 minute at 400° is sufficient to transfer a crisp, clear image from paper 145 onto surface 160.

The size of image 150 is controlled so that the desired size of image is transferred to part 10. The size of the image is referred to as the image area. Importantly, constant heat and pressure is applied by press platen 120 to the entire image area.

As noted earlier, the images may be transferred onto any part having any 3 dimensional shapes. To transfer any image to a non-planar part such as part 10 shown in FIG. 2, a mold is formed in the shape of the part. The paper, printed with an image having an image area is placed in the mold and constant heat and pressure is applied over the entire image area. In some instances, when transferring an image onto a 3 dimensional object, it is necessary to apply heat and pressure directly to the paper. In these cases the function of the heated press platen is accomplished with a mold that is formed into the shape of the part. As an example consider an aluminum baseball bat. To transfer an image onto the entire cylindrical surface of a bat, the surface of the bat is first anodized according to the process described above. A desired image having the desired image area is then prepared and the paper is wrapped around the bat in the desired orientation so that the image is aligned on the bat in the desired position. A heated mold that has the shape of the bat is then applied to the bat such that constant heat and pressure is applied over the entire image area, thereby transferring the image from the paper to the anodized outer surface of the bat. In this example the heat is applied directly to the transfer paper (on the side of the paper opposite the side on which the image is printed).

In some cases it is desirable to transfer an image to a surface where the image area is slightly larger than a portion of the surface of the part. For example, with reference to FIG. 2, there are times where the image area of image 150 is greater than the area of surface 160 in one or more dimensions. Continuing with this example, it may be desired in some cases that the image be transferred to a portion of at least one or more sides of part 10. This may be accomplished by moving the paper 145 so that it lies directly between parts 10 and template 140 and orienting the paper on the template so that the images 150 overlaps the openings 155 in one or more directions. The relative thickness of the template 140 also would be decreased. For example, the thickness of the template would be decreased relative to the thickness of part 10 so that the template is less thick than the part. As parts 10 are moved downwardly into the openings 155 of the template, the paper is pushed into the template openings and "wraps" upwardly on the sides of the parts, causing the paper to make contact with the sides of the parts. Since the image area is larger than the surface 160, the areas where the image extends beyond the outer periphery of surface 160 will be pressed into the sides of the parts. The template exerts pressure over this extended image area and the platen press heats the part, resulting in the image being transferred to the side of the part as well as the surface 160.

Post Transfer Processing

Figure 3:
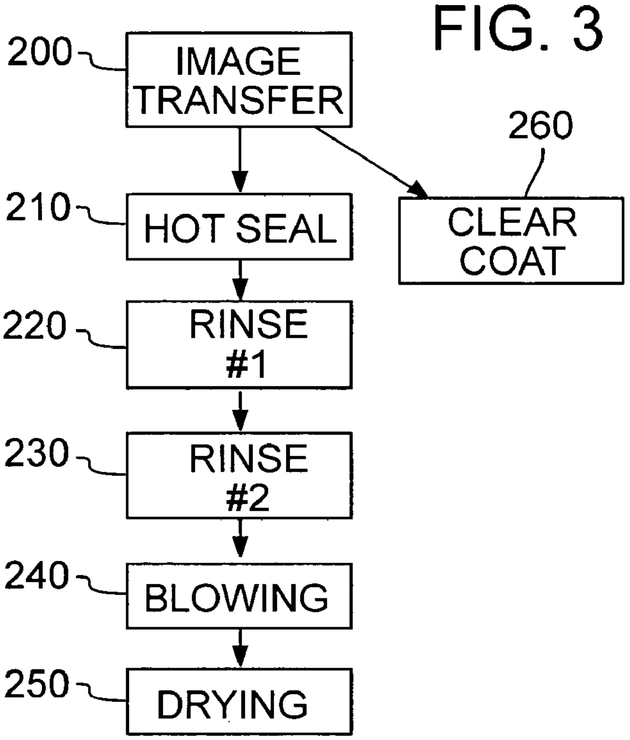
FIG. 3 is a flow chart detailing primary post image transfer processing steps according to the present invention.

After the image is transferred from the transfer paper to the part the part is further processed by sealing the surface according to a selected method to ensure longevity of the image. With reference to FIG. 3, there are different processing routes that may be used after image transfer is complete to seal the part. Thus, with image transfer 200 complete the part may be immersed in a hot seal tank 220. Hot seal tank 220 contains an aqueous solution held at about 170–200° F. and containing nickel acetate in an amount from about 0.5 to 4%, and preferably about 1%. The part is kept in the hot seal tank 220 for about 8 to 12 minutes, and more preferably about 10 minutes. After the part is removed from hot seal tank 220 it is transferred to a rinsing station that processes the part much in the same manner as described above with respect to post-anodizing rinsing. Specifically, the part is rinsed in a first clean water rinse 220, with water held at about 170° F. Although this rinse is preferably done in a tank, it may be accomplished with a flowing stream of heated water. The part is then optionally rinsed in a second clean water rinse at rinse tank 230, again with water held at about 170° F. either in a tank or in a flow. As noted earlier with reference to the anodizing rinse, preferably, the water used in the rinsing steps is deionized. However, this is typically difficult to use in an industrial setting, so clean water from municipal sources may be used where necessary.

With continued reference to FIG. 3, the rinsed part is then blown off with compressed air at 240 to remove all water from the part, and the part is then placed in a heated dryer 250 to ensure that it is completely dry.

As shown in FIG. 3, after image transfer 200 the part may alternately be processed to apply a clear coat 260. In this processing step a clear polyurethane coating is applied to the surface of the part onto which the image has been applied. The polyurethane is preferably a flat clear coat product, and it is preferably sprayed onto the part, although a gloss coat will suffice. One example of a suitable polyurethane coating product is mentioned below.

The image produced according to either of these post-image transfer processing steps is sharp and distinct with accurate, crisp colors and is durable and resists fading, even when exposed to direct ultra violet light for extended periods of time.

Alternative Processing Embodiments

The processing steps described above are particularly described with reference to transferring an image onto anodized surfaces. The invention described herein may also be used to transfer high quality full color images to objects made of other materials including metals that do not include an anoxic coating such as steel and stainless steel, and to plastics. A preferred process for transferring an image to such non-anoxic materials follows. As noted above, the image may be transferred to any part having a suitably prepared surface and which has any 3 dimensional configurations.

The surface of the part is first thoroughly cleaned to remove contaminants. The method used to clean the surface depends to some degree on the material that the part is made of. As a general principal, the cleaning should remove all contaminants from the part and leave the surface ready to accept coatings. Next, an opaque, preferably white latex coating is applied to the surface. The latex may be of various grades, but is preferably a flat color that is applied evenly by spraying. When the part comprises a plastic, the latex coating is optional. A latex coating suitable for purposes of the present invention is available from Strathmore Products, Inc. of Syracuse, N.Y. and sold under the product name P WA8802 Real Tree Mathews Xgray W/B EN.

After the latex coat is applied the part is allowed to cure in air for at least about 24 hours.

After drying in air or in a heated environment a flat, clear polyurethane coating is sprayed onto the surface. The polyurethane-coated part is then allowed to cure in air (at ambient temperature or in a heated environment) for at least about 24 hours. Numerous commercial grades of polyurethane may be used. One example is available as a two component polyurethane product (including a part A and part B) from Strathmore Products, Inc. of Syracuse, N.Y. and sold under the product name P CF8738-3 Flat Clear Urethane Part A, P ZM9564 Urethane Hardener Part B.

An image is prepared according to the printing steps described above in the section bearing the title Preparing the Image.

After the part has cured for a sufficient period of time a heat press 110 described above, slightly modified as described here, is then used to transfer the image to the part. First, a sheet of blocking material such as standard white paper is laid onto the base 130 to protect the base. The prepare part is then placed onto the base with the surface onto which the image is to be transferred facing upwardly, toward the platen press 120. The paper onto which the image has been prepared is then placed directly onto the part with the image area oriented onto the surface of the part in the desired position. The platen press, which has been preheated to about 400° F. is then moved downwardly so that the heated press exerts pressure directly onto the image-bearing paper and the underlying part. As noted above, it is important that pressure is applied evenly over the entire image area. The "cook time" is variable, depending upon the material used to fabricate the part and the thickness of the part. Without being bound by any particular theory, it is believed that the sublimation inks flow into the pores in the surface of the polyurethane-coated part.

Once the image has been transferred to the part the transfer paper is separated from the part and it is allowed to cool.

A template as detailed above may be used with the alternative embodiment described herein.

Furthermore, when the image is to be applied to a part having a 3 dimensional shape a mold is fabricated to receive the part. The transfer paper bearing the image is laid into the mold such that the image faces the interior of the mold, and the part is then placed into the mold. The mold is then closed such that the mold exerts pressure onto the image-bearing paper and the part, and specifically so that even pressure is applied over the entire image area. The mold is then heated to initiate sublimation of the inks in the image from the paper to the part. Once transfer of the image is complete the mold is opened, the paper is separated from the part and the part is allowed to cool.

As an example consider again the aluminum baseball bat. To transfer an image onto the entire cylindrical surface of a bat that has been treated with latex coating and a polyurethane coating, a desired image having the desired image area is prepared and the paper is wrapped around the bat in the desired orientation so that the image is aligned on the bat in the desired position. A heated mold that has the shape of the bat is then applied to the bat such that constant heat and pressure is applied over the entire image area, thereby transferring the image from the paper to the coated outer surface of the bat. In this example the heat is applied directly to the transfer paper (on the side of the paper opposite the side on which the image is printed).

While the present invention has been described in terms of a preferred embodiment, it will be appreciated by one of ordinary skill that the spirit and scope of the invention is not limited to those embodiments, but extend to the various modifications and equivalents as defined in the appended claims.

I claim:

1. A method of transferring an image on an aluminum part, the method comprising the steps of:

a) anodizing the part;

b) creating an image comprising an image area by printing an image on a transfer paper with ink capable of subliming from the paper;

c) orienting the paper on a base member and placing a template on the paper, wherein the template defines an opening sized to receive the part and the opening is oriented over the image area;

d) placing the part in the opening so that the image area contacts a surface of the part in a desired orientation;

e) heating the part and exerting pressure on the part such that the entire image area is subjected to heat and pressure to thereby cause the image to transfer to the part; and f) sealing the part.

2. The method according to claim 1 wherein the part defines a body having a 3 dimensional shape and wherein the image area contacts the surface of the part over at least a portion of the three dimensional shape.

3. The method according to claim 2 including the step of forming a mold having a 3 dimensional shape corresponding to the 3 dimensional shape of the body and configured for receiving and closing around the body, and wherein the mold is capable of being heated and exerting pressure on the paper and the part when received into the mold and the mold is closed.

4. The method according to claim 3 wherein the mold is heated to a temperature of about 400° F.

5. The method according to claim 1 including the steps orienting the paper on a base member, causing the part to make contact with the image area, and heating the part to indirectly heat the image.

6. The method according to claim 5 including the step of placing the template on a base, the template defining an opening sized to receive the part, and placing the paper on the template with the image area oriented over the opening, and wherein the part is pressed into contact with the paper and the paper and the part are received into the opening.

7. The method according to claim 6 wherein the image area is larger than the opening in at least one dimension such that the image area overlaps at least one peripheral edge of the opening.

8. The method according to claim 7 including the step of heating the part with a heat press that makes contact with the part remotely from the surface of the part that is in contact with the image area to thereby indirectly heat the image and cause the image to transfer from the paper to the part.

9. The method according to claim 1 including the step of heating the part with a heat press that makes contact with the part remotely from the surface of the part that is in contact with the image area to thereby indirectly heat the image and cause the image to transfer from the paper to the part.

10. The method according to claim 1 wherein the part is heated to about 400° F. and about 40 $lbs/in^2$ pressure is exerted over the entire image area.

11. The method according to claim 10 including the step of sealing the part after the image has been transferred from the paper to the part.

12. The method according to claim 11 wherein the sealing step comprises immersing the part in an aqueous solution containing nickel acetate.

13. The method according to claim 10 wherein the sealing step comprises the step of coating the part with a clear urethane.

14. The method according to claim 1 including the step of disrupting the surface of the part prior to anodizing the part.

15. The method according to claim 14 wherein the disrupting step further comprises bead blasting the part.

* * * * *